US009372935B2

(12) United States Patent
Roberts et al.

(10) Patent No.: US 9,372,935 B2
(45) Date of Patent: Jun. 21, 2016

(54) CONTENT MANAGEMENT AND ACCESS SYSTEMS AND METHODS

(75) Inventors: Brian Roberts, Frisco, TX (US); Don Relyea, Dallas, TX (US); Shadman Zafar, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 620 days.

(21) Appl. No.: 12/165,027

(22) Filed: Jun. 30, 2008

(65) Prior Publication Data

US 2009/0327305 A1    Dec. 31, 2009

(51) Int. Cl.
G06F 7/00 (2006.01)
G06F 17/00 (2006.01)
G06F 17/30 (2006.01)
G06F 3/06 (2006.01)
G06F 11/14 (2006.01)

(52) U.S. Cl.
CPC .......... *G06F 17/3089* (2013.01); *G06F 3/0649* (2013.01); *G06F 11/1458* (2013.01); *G06F 17/30035* (2013.01); *G06F 17/3071* (2013.01); *G06F 17/30864* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 2002/0047899 A1* | 4/2002 | Son et al. ...................... 348/114 |
| 2004/0064824 A1* | 4/2004 | McNeely et al. ............. 719/316 |
| 2004/0088313 A1* | 5/2004 | Torres ........................... 707/101 |
| 2004/0133848 A1* | 7/2004 | Hunt et al. .................... 715/500 |
| 2005/0091272 A1* | 4/2005 | Smith et al. ................. 707/104.1 |
| 2006/0052091 A1* | 3/2006 | Onyon et al. ................. 455/415 |
| 2006/0218153 A1* | 9/2006 | Voon et al. ..................... 707/10 |
| 2007/0067315 A1* | 3/2007 | Hegde et al. ................... 707/10 |
| 2007/0100834 A1* | 5/2007 | Landry et al. .................. 707/10 |
| 2007/0214141 A1* | 9/2007 | Sittig et al. ....................... 707/7 |
| 2007/0233291 A1* | 10/2007 | Herde et al. ..................... 700/91 |
| 2007/0239724 A1* | 10/2007 | Ramer et al. ................... 707/10 |
| 2008/0021958 A1* | 1/2008 | Foote ............................. 709/204 |
| 2008/0082421 A1* | 4/2008 | Onyon et al. ................... 705/14 |
| 2008/0098112 A1* | 4/2008 | Banga et al. .................. 709/225 |
| 2008/0098459 A1* | 4/2008 | Banga et al. ..................... 726/3 |
| 2008/0133445 A1* | 6/2008 | Pennington ...................... 707/1 |
| 2008/0155634 A1* | 6/2008 | Khedouri et al. ............. 725/118 |

OTHER PUBLICATIONS

George Olsen; Persona Creation and Usage Toolkit; Mar. 2004; Interaction by Design; pp. 1-18.*

* cited by examiner

*Primary Examiner* — Amresh Singh
*Assistant Examiner* — Jermaine Mincey

(57) ABSTRACT

An exemplary method includes receiving data representative of a content instance over a network from an access device associated with a user, storing the data representative of the content instance, providing the user with an interface configured to allow the user to define at least one access rule corresponding to the content instance, the at least one access rule based on at least one user profile and at least one access device profile, receiving a communication from another access device over the network, and performing a predefined action related to the content instance in response to the communication and in accordance with the at least one access rule.

23 Claims, 14 Drawing Sheets

CONTENT MANAGEMENT AND ACCESS SYSTEMS AND METHODS

BACKGROUND INFORMATION

Advances in electronic communications technologies have interconnected people and allowed for distribution of information perhaps better than ever before. To illustrate, mobile phones, which were previously used for voice communications only, are increasingly being used to acquire and transmit photographs, video, audio, and/or other content to other mobile phones and to other types of electronic devices.

As the variety of electronic devices used to acquire, transmit, and access content becomes more diverse, it has become increasingly desirable for content acquired by a particular electronic device to be accessible by other electronic devices. For example, a particular user may desire to access content acquired by a mobile phone with a personal computer, set-top box, handheld device, and/or any other electronic device. The user may additionally or alternatively desire to allow electronic devices associated with other users to access the acquired content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
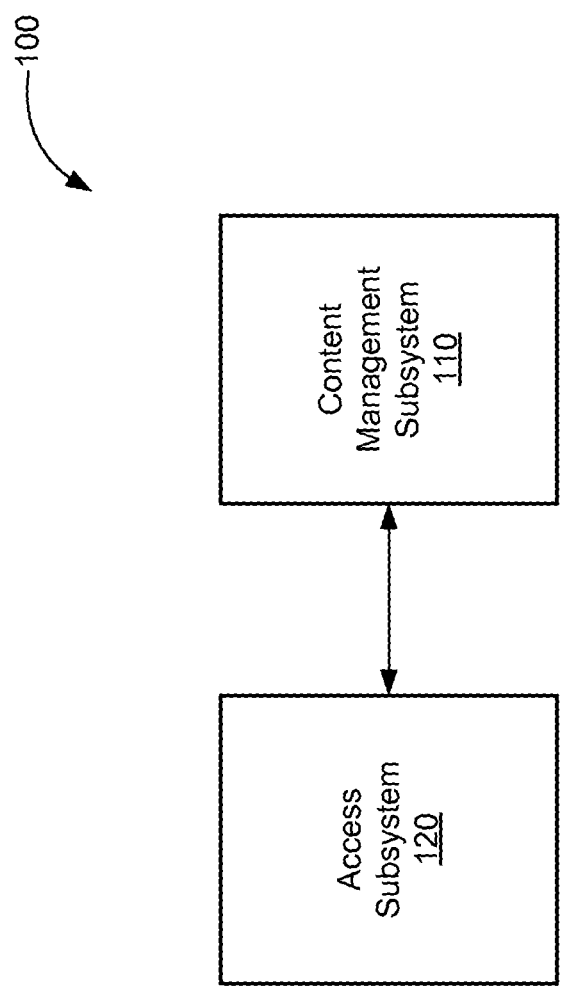
FIG. 1 illustrates an exemplary content management and access system according to principles described herein.

Content management and access systems and methods are described herein. The exemplary systems and methods may provide a centralized, efficient, and secure experience for users desiring to store and manage content acquired or otherwise provided by various types of access devices. The exemplary systems and methods may further provide ways for users to allow other users to access content with various types of access devices.

In some examples, an access subsystem associated with a user may be selectively and communicatively coupled to a content management subsystem over a network. The access subsystem is configured to transmit data representative of a content instance to the content management subsystem and provide an interface (e.g., a graphical user interface) configured to allow the user to define at least one access rule corresponding to the content instance. The at least one access rule may be based on at least one user profile and at least one access device profile and may specify or define one or more permissions, conditions, associations, and/or other factors that must be complied with in order for a user to access the content instance stored within content management subsystem with a particular access device.

As will be described in more detail below, the content management subsystem may perform a predefined action related to the content instance in response to a communication received from another access device and in accordance with the at least one access rule. The predefined action may include, but is not limited to, providing the other access device with a specified level of access to the content instance, formatting the content instance for the other access device, denying access to the content instance, and/or otherwise processing the content instance.

As used herein, the term "content instance" refers generally to any data record or object (e.g., an electronic file) storing or otherwise associated with content, which may include electronic data representative of text, one or more messages (e.g., short message service ("SMS") messages, electronic mail messages, or multimedia message service ("MMS") messages), one or more symbols, one or more graphics, one or more images (e.g., digital photographs and video frames), email contacts, video, audio, multimedia, video games, or any segment, component, or combination of these or other forms of electronic data that may be viewed or otherwise experienced by a user.

Hence, the systems and methods described herein may enable a user to control access of content stored within content management subsystem to certain users, groups of users, access devices, and/or types of access devices. For example, a user may upload a movie to the content management subsystem and grant one or more users with the ability to view the movie. The user may additionally or alternatively specify that a particular formatting is be applied when a particular type of access device (e.g., a mobile phone) is used to access the movie.

FIG. 1 illustrates an exemplary content management and access system 100 (or simply "system 100"). As shown in FIG. 1, system 100 may include a content management subsystem 110 and an access subsystem 120 configured to communicate with one another. Access subsystem 120 and content management subsystem 110 may communicate using any communication platforms and technologies suitable for transporting data representative of content, content metadata, content management commands, and/or other communications, including known communication technologies, devices, media, and protocols supportive of remote or local data communications. Example of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, and other suitable communications networks and technologies.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of computing devices, and may employ any of a number of computer operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
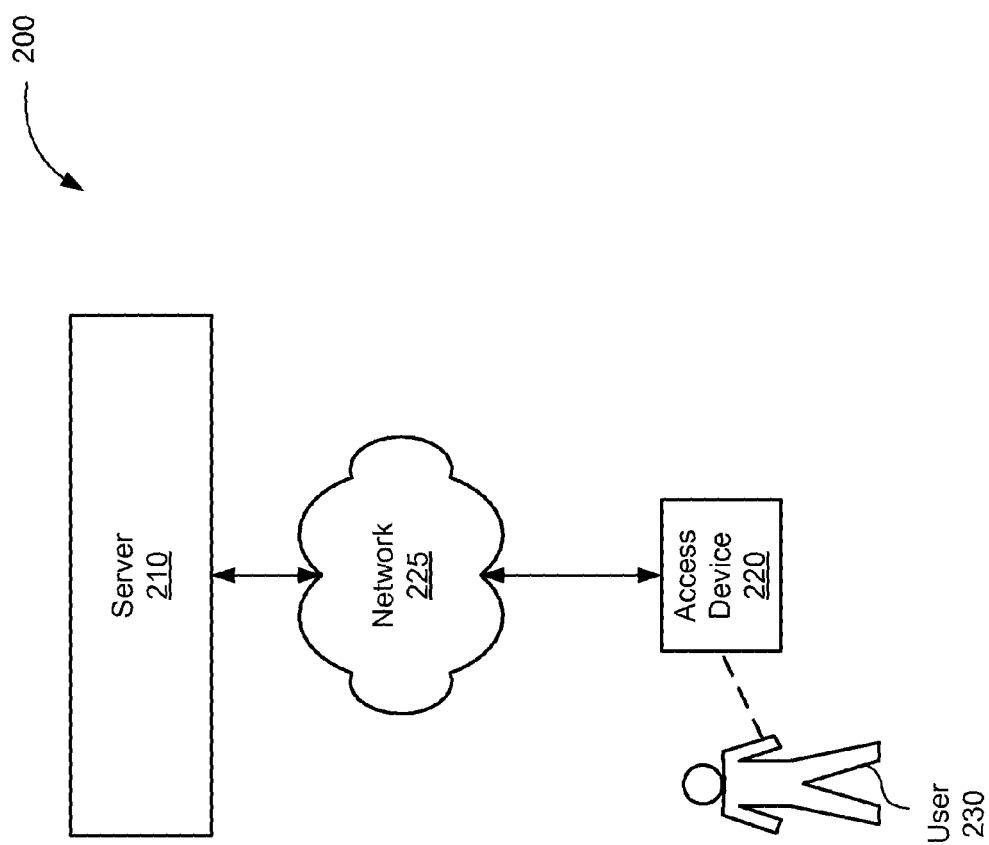
FIG. 2 illustrates an exemplary implementation of the system of FIG. 1 according to principles described herein.

FIG. 2 illustrates an exemplary implementation 200 of system 100. In implementation 200, content management subsystem 110 may include or be implemented within at least one server 210, and access subsystem 120 may include or be implemented within at least one access device 220 configured to communicate with server 210 by way of a network 225. Network 225 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol "(VoIP") networks, Public Switched Telephone Networks ("PSTN"), and any other networks capable of carrying data representative of content, data associated with content (e.g., metadata), data management commands, and/or communications signals between access device 220 and server 210. Communications between the server 210 and the access device 220 may be transported using any one of above-listed networks, or any combination or sub-combination of the above-listed networks. In certain exemplary embodiments, network 225 includes a mobile telephone network and/or a subscriber television network.

Access device 220 may be associated with one or more users, which in certain embodiments may be subscribers to or users of one or more services (e.g., a wireless telephone service) provided over network 225. As an example, FIG. 2 shows user 230 as being associated with access device 220. The exemplary user 230 and the association of user 230 with access device 220 are shown for illustrative purposes. Other user associations with access device 220 may be defined in system 100.

Access device 220 may include any device configured to perform one or more of the content management processes described herein, including communicating with and/or transmitting and receiving content, data associated with content (e.g., metadata), and/or content operation commands to/from content management subsystem 110 by way of network 225. Access device 120 may include, but is not limited to, a computing device (e.g., a desktop or laptop computer), a set-top box, a communication device, a wireless computing device, a wireless communication device (e.g., a mobile phone), a personal digital assistant, a content recording device (e.g., a camera, audio recorder, video camera), a vehicular computing and/or communication device, a content-enabled device, a gaming device, and/or any other device configured to acquire, transmit, receive, access, or otherwise process content.

Figure 3:
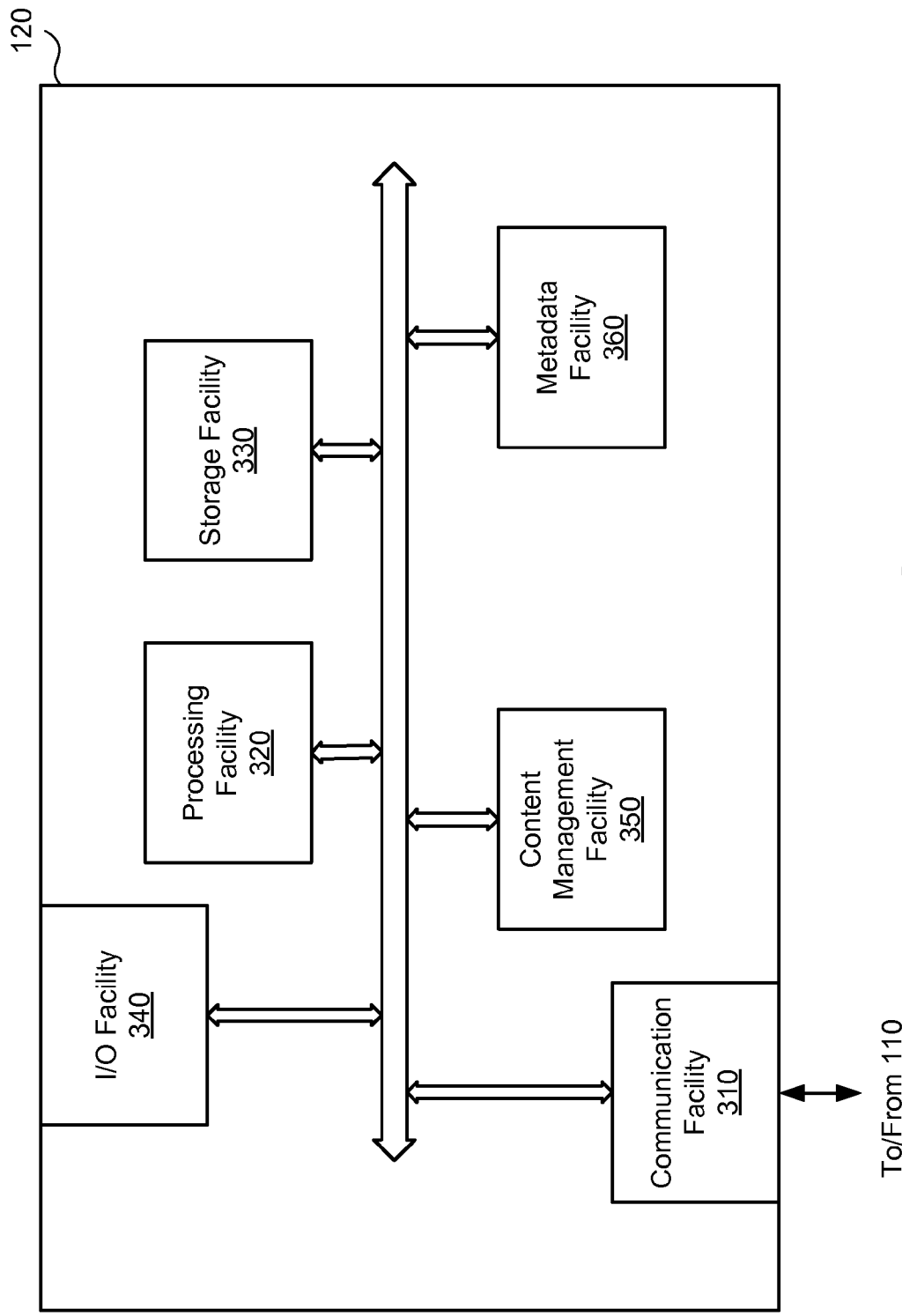
FIG. 3 illustrates components of an exemplary access subsystem according to principles described herein.

FIG. 3 illustrates components of an exemplary access subsystem 120. As shown in FIG. 3, access subsystem 120 may include a communication facility 310, processing facility 320, storage facility 330, input/output ("I/O") facility 340, content management facility 350, and metadata facility 360 communicatively connected to one another. The facilities 310-360 may be communicatively connected using any suitable technologies. Each of the facilities 310-360 may be implemented as hardware, computing instructions (e.g., software) tangibly embodied on a computer-readable medium, or a combination of hardware and computing instructions configured to perform one or more of the processes described herein. In certain embodiments, for example, content management facility 350 and/or one or more other facilities may be implemented as one or more software applications embodied on a computer-readable medium such as storage facility 330 and configured to direct processing facility 320 of the access subsystem 120 to execute one or more of the processes described herein.

Communication facility 310 may be configured to communicate with content management subsystem 110 (e.g., over network 225), including sending and receiving data representative of content, data associated with content (e.g., metadata), content management commands, and/or other communications to/from content management subsystem 110. Communication facility 310 may include any device, logic, and/or other technologies suitable for transmitting and receiving data representative of content, content metadata, content management commands, and other communications. In certain embodiments, communication facility 310 may be configured to support other network service communications over network 225, including wireless voice, data, and messaging service communications, for example. Communication facility 310 may be configured to interface with any suitable communication media, protocols, formats, platforms, and networks, including any of those mentioned herein.

Processing facility 320 may be configured to execute and/or direct execution of operations of one or more components of the access device 220. Processing facility 320 may direct execution of operations in accordance with computer-executable instructions such as may be stored in storage facility 330 or another computer-readable medium. As an example, processing facility 320 may be configured to process content, including demodulating, decoding, and parsing received content, and encoding and modulating content for transmission to content management subsystem 110.

Storage facility 330 may include one or more data storage media, devices, or configurations and may employ any type, form, and combination of storage media. For example, the storage facility 330 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of content and/or content metadata (e.g., one or more content instances), may be temporarily and/or permanently stored in the storage facility 330.

I/O facility 340 may be configured to receive user input and provide user output and may include any hardware, firmware, software, or combination thereof supportive of input and output capabilities. For example, I/O facility 340 may include one or more devices for capturing or otherwise creating content, including, but not limited to, a still-shot camera, video camera, scanner, microphone, keyboard or keypad, touch screen component, and/or receiver (e.g., an RF or infrared receiver). Accordingly, a user 230 of access subsystem 120 may create or otherwise acquire content (e.g., by taking a picture, creating a word processing document, or downloading a data file) and provide the content to content management subsystem 110, as described below.

I/O facility 340 may include one or more devices for presenting content for experiencing by the user 230, including, but not limited to, a graphics engine, a display, one or more display drivers, one or more audio speakers, and one or more audio drivers. Accordingly, I/O facility 340 may present content (e.g., play back and/or display) for experiencing by the user 230. I/O facility 340 may also be configured to provide other output for the user 230, including graphical user interfaces, indications of related content, and one or more tools for navigating related content, as described further below.

Content management facility 350 may be configured to provide one or more tools for management of content. The tools may include or be provided using hardware, computer-readable instructions embodied on a computer-readable medium such as storage facility 330, or a combination of hardware and computer-readable instructions. In certain embodiments, content management facility 350 may be implemented as a software application embodied on a computer-readable medium such as storage facility 330 and configured to direct the processing facility 320 of the access subsystem 120 to execute one or more of the content management operations described herein.

The tools may be configured to enable user 230 to create, format, modify, delete, annotate (e.g., edit, rate, label, add a note to, comment about, and categorize content), access, retrieve, copy, move, send, request, receive, and/or otherwise manage content stored within access subsystem 120 and/or content management subsystem 110. For example, a user 230 utilizing the content management tools may create and provide a content instance to content management subsystem 110. Through content management facility 350, the user 230 may access and manage the content instance. Content management facility 350 may generate and provide content management commands to content management subsystem 110, which may be configured to receive and process the commands, and to identify and perform appropriate content management operations based on the commands. Content management commands may include instructions to store, transmit, share, recommend, modify, delete, annotate, access, retrieve, copy, move, and/or perform any other operations on content.

Metadata facility 360 may be configured to perform operations associated with content metadata, including generating, updating, and providing content metadata. The term "metadata" as used herein refers generally to any electronic data descriptive of content and/or content instances. For example, metadata may include, but is not limited to, content instance identifiers (e.g., file names), time data, location data, user data, source data, destination data, size data, creation data, modification data, data structure data, and access data descriptive of content and/or one or more content instances. Examples of metadata may include time data associated with a data operation (e.g., creating, modifying, deleting, receiving, or sending content), location data associated with a data operation (e.g., a geographic or network location at which content is created), user data identifying one or more users associated with content (e.g., a user who created, modified, deleted, sent, received, accessed, or otherwise operated on or is owner of content), content type information (e.g., file type or other predefined category of content), content transport information, source data associated with a source of content (e.g., a user from whom content is received), and destination data associated with a destination to which content is sent (e.g., a user to whom content is transmitted).

Metadata facility 360 may include hardware, computer-readable instructions embodied on a computer-readable medium such as storage facility 330 (e.g., one or more content management software applications), or a combination of hardware and computer-readable instructions. In certain embodiments, metadata facility 360 may be implemented as a software application embodied on a computer-readable medium such as storage facility 330 and configured to direct the processing facility 320 of the access subsystem 120 to execute one or more of metadata operations described herein.

Metadata facility 360 may be configured to detect content management operations and to generate, update, and/or provide metadata associated with the operations. For example, when a content instance is created or otherwise acquired, metadata facility 360 may detect the creation or acquisition of the content instance and identify and provide one or more metadata values associated with the content instance, such as time metadata indicating a time at which the content instance is created, user metadata indicating a user who created the metadata, and/or content type metadata indicating a type (e.g., a file type or predefined content category) to be associated with the content instance. As an example, if access subsystem 120 is utilized to capture a photograph, metadata facility 360 may detect the creation of the photograph and generate and provide metadata indicating a time at which the photograph is taken, a user associated with the access subsystem 120 who took the photograph, and a content type associated with the photograph (e.g., a photo or image category type, or a file type for a digital photograph).

Metadata facility 360 may in similar manner detect other content operations and generate, update, delete, and/or provide metadata associated with the content operations. For example, if a content instance is transmitted to a destination, such as by transmitting a copy of the content instance over network 225, metadata facility 360 may detect the transmission of the content instance and generate and provide metadata indicating a time at which the content instance is sent and the destination to which the content instance is sent (e.g., a user or remote device identifier). Similarly, if another content instance is received by access subsystem 120 from a source (e.g., content management subsystem 110), metadata facility 360 may detect the receipt of the other content instance and generate and provide metadata indicating a time at which the other content instance is received and the source that provided the other content instance.

In some examples, metadata facility 360 may provide content metadata to content management subsystem 110 or to content management facility 350, which may be configured to associate the content metadata with the corresponding content and provide the content and/or content metadata to content management subsystem 110. Content management subsystem 110 may be configured to maintain and utilize the content metadata to identify relationships between content instances, and to utilize the relationships to identify and retrieve related content.

Figure 4:
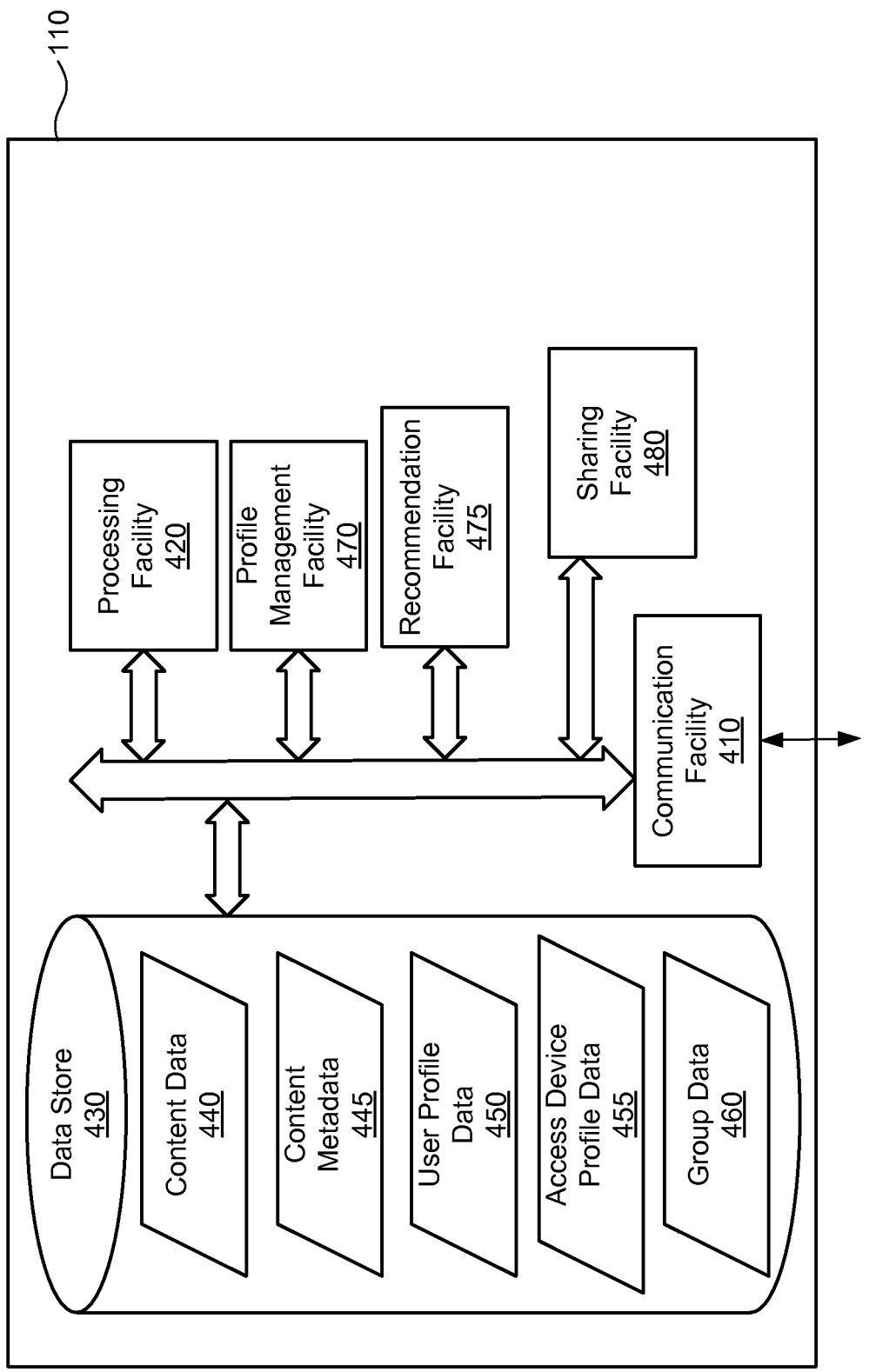
FIG. 4 illustrates an exemplary content management subsystem according to principles described herein.

FIG. 4 illustrates an exemplary content management subsystem 110. The components of content management subsystem 110 may include or be implemented as hardware, computing instructions (e.g., software) embodied on a computer-readable medium, or a combination thereof. In certain embodiments, for example, one or more components of content management subsystem 110 may include or be implemented on one or more servers, such as server 210, configured to communicate over network 225. While an exemplary content management subsystem 110 is shown in FIG. 4, the exemplary components illustrated in FIG. 4 are not intended to be limiting. Indeed, additional or alternative components and/or implementations may be used.

As shown in FIG. 4, content management subsystem 110 may include a communication facility 410, which may be configured to communicate with access subsystem 120, including receiving data representative of content, data associated with content (e.g., metadata), and content data operations from access subsystem 120 and/or any other device or subsystem. Communication facility 410 may additionally or alternatively be configured to transmit content, data associated with content (e.g., metadata), and/or any other data to access subsystem 120 and/or any other device or subsystem by way of network 225. The communication facility 410 may include and/or support any suitable communication platforms and technologies for communicating with and transporting content and associated data to/from access subsystem 120. Communication facility 410 may be configured to support a variety of communication platforms, protocols, and formats such that content management subsystem 110 can receive content from and distribute content to a variety of computing platforms (e.g., a mobile telephone service platform, a web-based platform, a subscriber television platform, etc.) using a variety of communications technologies. Accordingly, the content management subsystem 110 may be configured to support a multi-platform system in which content can be received from and provided to diverse platforms.

Content management subsystem 110 may include a processing facility 420 configured to control operations of components of the content management subsystem 110. Processing facility 420 may execute or direct execution of operations in accordance with computer-executable instructions stored to a computer-readable medium such as a data store 430. As an example, processing facility 420 may be configured to process (e.g., encode, decode, modulate, and/or demodulate) content, data associated with content (e.g., metadata), and/or communications received from or to be transmitted to access subsystem 120. As another example, processing facility 420 may be configured to perform data management operations on data stored in data store 430, including any of the content management operations described above. For example, processing facility 420 may operate on content data 440, including storing content data 440 to data store 430 as shown in FIG. 4 and indexing, searching, accessing, retrieving, modifying, annotating, backing up, encrypting, encoding, decrypting, decoding, copying, and/or deleting content data 440.

In some examples, processing facility 420 may be configured to perform device-specific content formatting before content is provided to (e.g., downloaded by) a particular access device 220. In this manner, the content may be optimally viewed or otherwise experienced by a user of the access device 220.

Data store 430 may include one or more data storage media, devices, or configurations and may employ any type, form, and combination of storage media. For example, the data store 430 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data store 430 may store any suitable type or form of electronic data, including content data 440, content metadata 445, user profile data 450, access device profile data 455, and/or group data 460. Content data 440 may include or be stored within one or more content instances. Content metadata 445 may include metadata associated with one or more of the content instances.

User profile data 450 may include any information descriptive of one or more users who are associated with access subsystem 120 or who receive services provided over network 225. User profile data 450 may include user authentication information, user identifiers, information about one or more access devices 120 that correspond with a user, user preferences, and any other information related to one or more users. User profile data 450 will be described in more detail below.

Access device profile data 455 may include any information descriptive of access subsystem 120 and/or any access device 220 configured to communicate with content management subsystem 110. For example, access device profile data 455 may include data representative of one or more access device identifiers, network addresses (e.g., internet protocol ("IP") addresses), network resources, computing resources, subscription information, device permissions, platforms, etc. Access device profile data 455 will be described in more detail below.

Group data 460 may include any information that can be used to identify groupings of users 230 and/or access devices 220. For example, group data 460 may include information indicating that certain users 230 are members of a group. Accordingly, group data 460 may be useful for facilitating selective access of content data 440 by users 230 within a group. In certain embodiments, group data 460 may include information that can be used to access user profile data 450 corresponding to users in a group, and the user profile data 450 may include information that can be used to identify user associations with access devices 120.

Group data 460 may be defined in any suitable manner, including users (e.g., a subscription account owner) defining groups and providing data representative of the defined groups to content management subsystem 110. In certain embodiments, at least certain groups are defined based on user subscription accounts for services provided over network 225. For example, a default group may be defined by content management subsystem 110 to include any users associated with a subscription account (e.g., a network data storage account).

In certain embodiments, data 440-460 may be stored using one or more suitable data entities and/or structures, including one or more relational or hierarchical data tables, for example. In other embodiments, content metadata 445, user profile data 450, access device profile data 455, and/or group data 460 may be stored as part of the content instances to which they are associated.

Content management subsystem 110 may include a profile management facility 470, which may be configured to manage one or more user profiles and/or access device profiles and/or maintain a database of permissions associated therewith. For example, profile management facility 470 may be configured to facilitate updating of a user profile and/or an access device profile by a user. Additionally or alternatively, profile management facility 470 may be configured to process a user profile and/or an access device profile in the context of a user requesting access to content stored within data store 430 and determine, based on the user profile and/or access device profile, whether the user should be granted access to the content.

Content management subsystem 110 may further include a recommendation facility 475, which may be configured to identify one or more relationships between content instances, and, based on those relationships, provide one or more content recommendations to one or more users. Recommendation facility 475 may include or be implemented as hardware, computing instructions (e.g., software) tangibly embodied on a computer-readable medium, or a combination of hardware and computing instructions configured to perform one or more of the processes described herein. In certain embodiments, recommendation facility 475 may be implemented as a software application embodied on a computer-readable medium such as data store 430 and configured to direct the processing facility 420 to execute one or more of the processes described herein.

Recommendation facility 475 may be configured to identify certain "relationships" between content instances included in the content data 440 and to utilize the identified relationships to selectively identify and/or retrieve related content instances. The conditions needed to qualify as a "relationship" between content instances may be defined in advance. For example, recommendation facility 475 may include or otherwise have access to a predefined relationship heuristic, which may include one or more conditions defining one or more relationships. When a set of one or more conditions for a relationship is satisfied, recommendation facility 475 may identify the existence of the relationship between content instances. Examples of relationships between content, i.e., content relationships, may include, but are not limited to, content type relationships, content source based relationships, content destination based relationships, user preference based relationships, location based relationships, time based relationships, and user based relationships. These examples are illustrative only. The relationships and conditions for the relationships may be tailored as may suit a particular implementation or application of content management subsystem 470.

In certain examples, a relationship may be defined to exist between content instances when content metadata 445 associated with content instances includes common metadata values. For example, a location based relationship between content instances may be determined to exist when location metadata values for the content instances are at least substantially similar. For instance, two photographs created at a common location (e.g., the same geographic location or network address) may be determined to be related by location. Similarly, common metadata values for other components of metadata may be used to determine that other types of relationships exist. Examples of other metadata components may include, but are not limited to, time metadata, user metadata, content type metadata, and source and/or destination metadata. These metadata components may be used to determine whether time based, user based, content type based, content source based, and content destination based relationships exist between content instances. An exemplary time based relationship may identify substantially concurrent performance of content management operations such as creation of content instances at substantially the same time. An exemplary user based relationship may identify that content management operations were initiated by or otherwise associated with the same user or user profile. An exemplary content type based relationship may identify content instances that are of the same type (e.g., same predefined category or file type). An exemplary content source based relationship may identify that content instances have been received from a common source. An exemplary content destination based relationship may identify content instances that have been sent to a common destination.

In certain examples, common metadata values may refer to metadata values that are within a predefined threshold of one another. For example, a location based relationship between content instances may be determined to exist when location metadata values for the content instances are within a predefined maximum geographic distance threshold. For instance, two photographs created at locations that are geographically nearer to one another than the predefined maximum distance may be determined to be related by location. Similarly, predefined thresholds for metadata values for other components of metadata (e.g., a predefined maximum period of time between two time data values) may be used to define and determine that other relationships exist.

In some examples, conditions for relationships may be based on user input, preferences, or activity. For example, recommendation facility 475 may identify one or more relationships based on one or more search terms input by a user.

In certain embodiments, recommendation facility 475 is configured to dynamically identify one or more content relationships in response to a request to access a content instance. Additionally or alternatively, recommendation facility 475 may identify one or more relationships based on an identified trend or pattern in user activity.

Recommendation facility 475 may be further configured to provide content recommendations for presentation to a user based on the identified relationships. For example, recommendation facility 475 may be configured to cause one or more links to recommended content to be presented to a user. The user may then select the one or more links to access the recommended content.

In some examples, recommendation facility 475 may additionally or alternatively be configured to identify one or more users who may be interested in a particular content instance. Such identification may be based on content metadata 445, user profile data 450, access device profile data 455, group data 460, tracked browsing and content access activity, and/or any other data or heuristic as may serve a particular application.

Content management subsystem 110 may further include a sharing facility 480, which may be configured to facilitate and manage sharing of content between different users 230 and/or access devices 220. Sharing facility 480 may include or be implemented as hardware, computing instructions (e.g., software) tangibly embodied on a computer-readable medium, or a combination of hardware and computing instructions configured to perform one or more of the processes described herein. In certain embodiments, sharing facility 480 may be implemented as a software application embodied on a computer-readable medium such as data store 430 and configured to direct the processing facility 420 to execute one or more of the processes described herein. Sharing of content will be described in more detail below.

As mentioned, content management subsystem 110 may be configured to support communication with access subsystem 120 via multiple network platforms. For example, user 230 may utilize multiple access devices 220, each a part of a different network platform, to provide and/or access content stored within content management subsystem 110.

Figure 5:
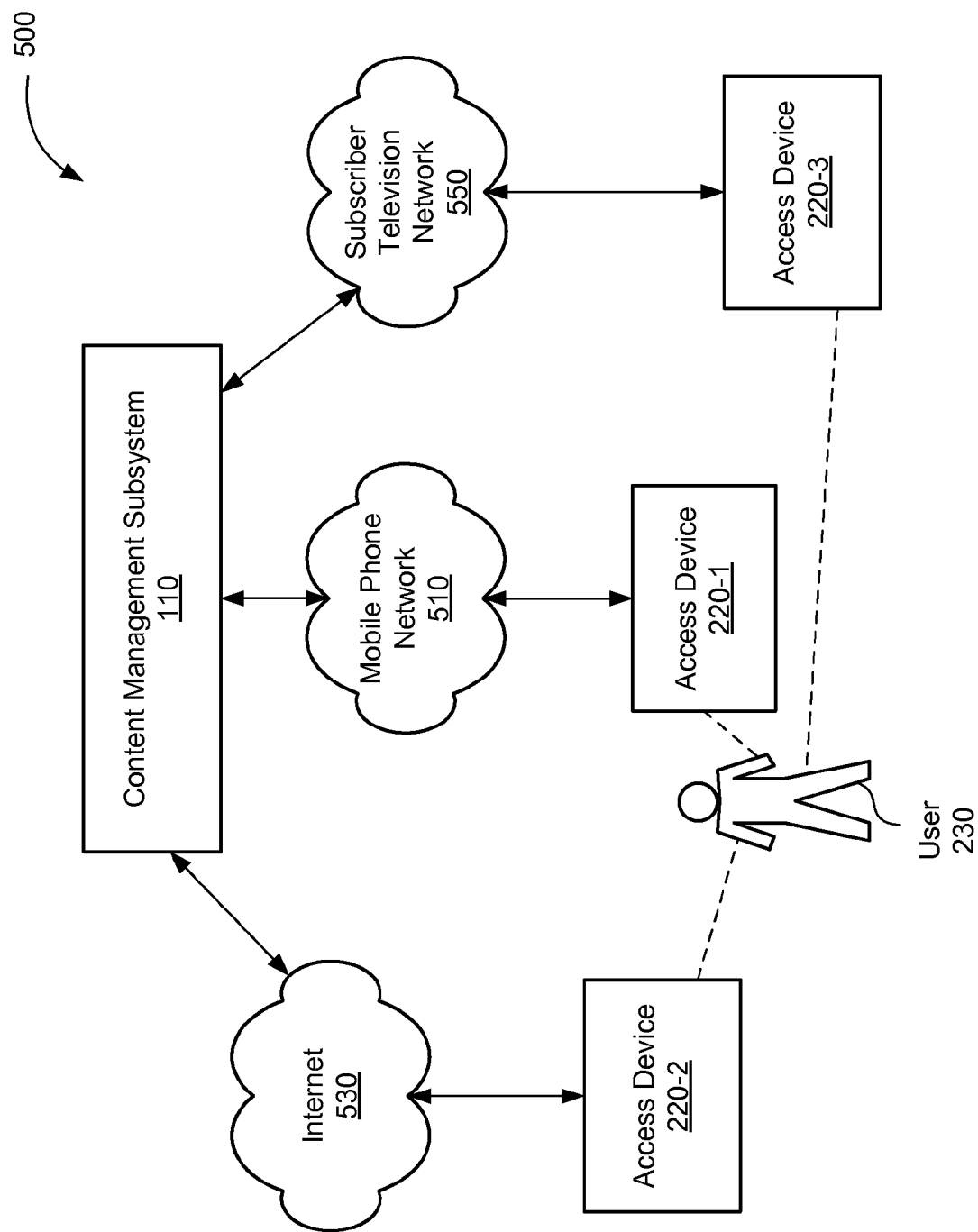
FIG. 5 shows an exemplary implementation of the system of FIG. 1 according to principles described herein.

To illustrate, FIG. 5 shows an exemplary implementation 500 of system 100. As shown in FIG. 5, the implementation 500 may include content management subsystem 110 and access devices 220-1 through 220-3 (collectively referred to herein as "access devices 220") associated with user 230. Content management subsystem 110 may be configured to communicate with each access device 220 over a different network platform. For example, content management subsystem 110 may be configured to communicate with access device 220-1 (e.g., a mobile phone) over a mobile phone network 510, with access device 220-2 (e.g., a personal computer) over the Internet 530, and/or with access device 220-3 (e.g., a set-top box) over subscriber television network 550. Hence, user 230 may be able to utilize any of the access devices 220-1 through 220-3 to provide and/or access content stored within content management subsystem 110. It will be recognized that mobile phone network 510, the Internet 530, and subscriber television network 550 may be part of network 225 shown in FIG. 2. It will also be recognized that the networks shown in FIG. 5 are merely illustrative of the many different types of networks that may facilitate communication between content management subsystem 110 and access subsystem 120.

Figure 6:
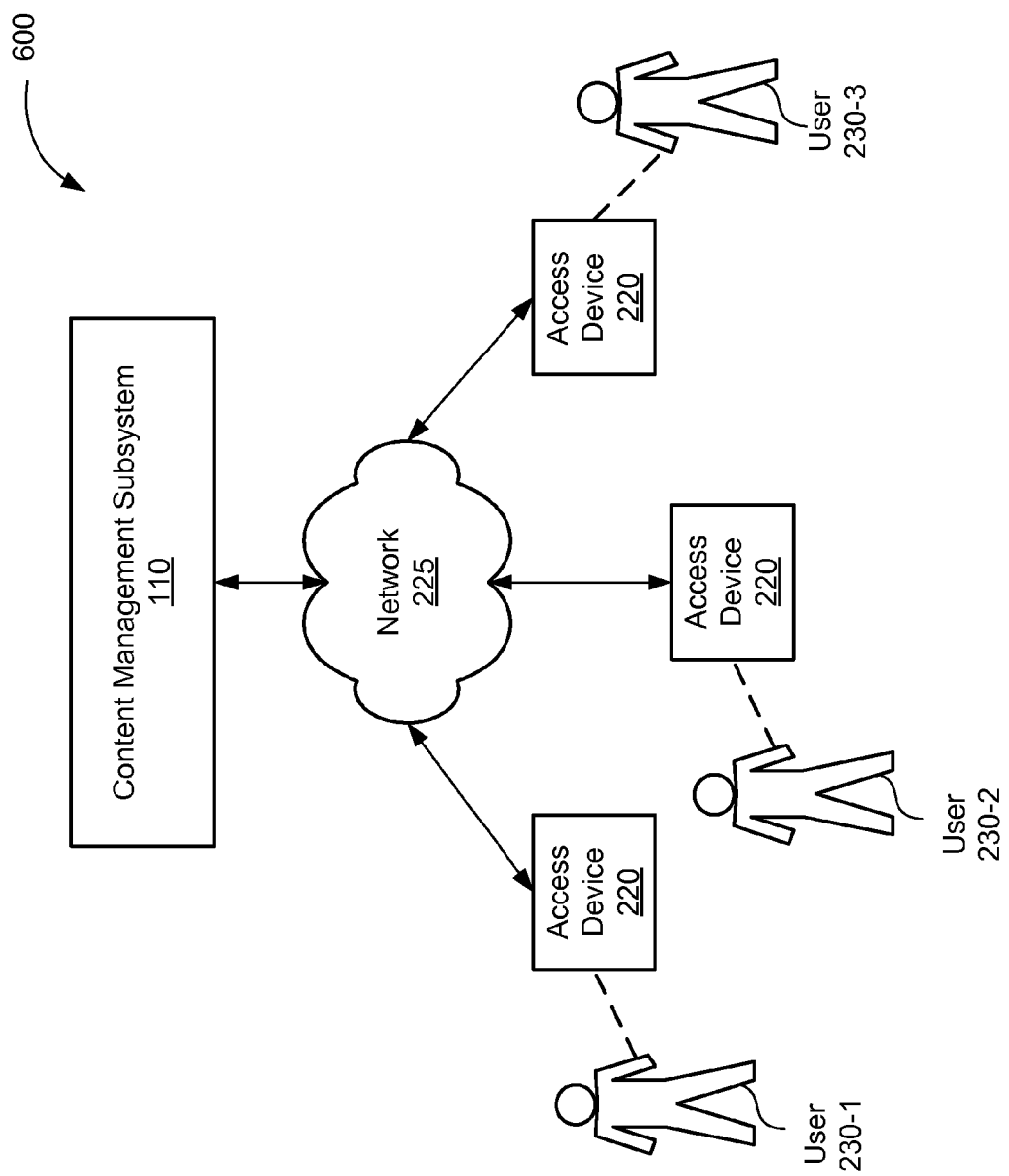
FIG. 6 shows an exemplary implementation of the system of FIG. 1 wherein multiple users may utilize one or more access devices to communicate with content management subsystem over a network according to principles described herein.

Content management subsystem 110 may be configured to support interaction with multiple users. For example, FIG. 6 shows an exemplary implementation 600 of system 100 wherein multiple users 230-1 through 230-3 (collectively referred to herein as "users 230") may utilize one or more access devices 220 to communicate with content management subsystem 110 over network 225. Each user 230 may provide and/or access content stored within content management subsystem 110 via one or more of the access devices 220. In this manner, as will be described in more detail below, content may be shared between multiple users 230.

Content may be provided (e.g., uploaded) from access subsystem 120 to content management subsystem 110 in any suitable manner. For example, content may be pushed to or pulled by content management subsystem 110 in accordance with a defined schedule or frequency, or in response to the occurrence of defined events such as a content management operation.

In some examples, bandwidth limitations, service agreement limitations, and/or other impediments may limit the amount and/or type of content that may be uploaded to and/or downloaded from content management subsystem 110 by a particular access device 220. For example, some access devices 220 (e.g., mobile phones, handheld devices, etc.) may not be configured to be able to communicate directly with content management subsystem 110.

Figure 7:
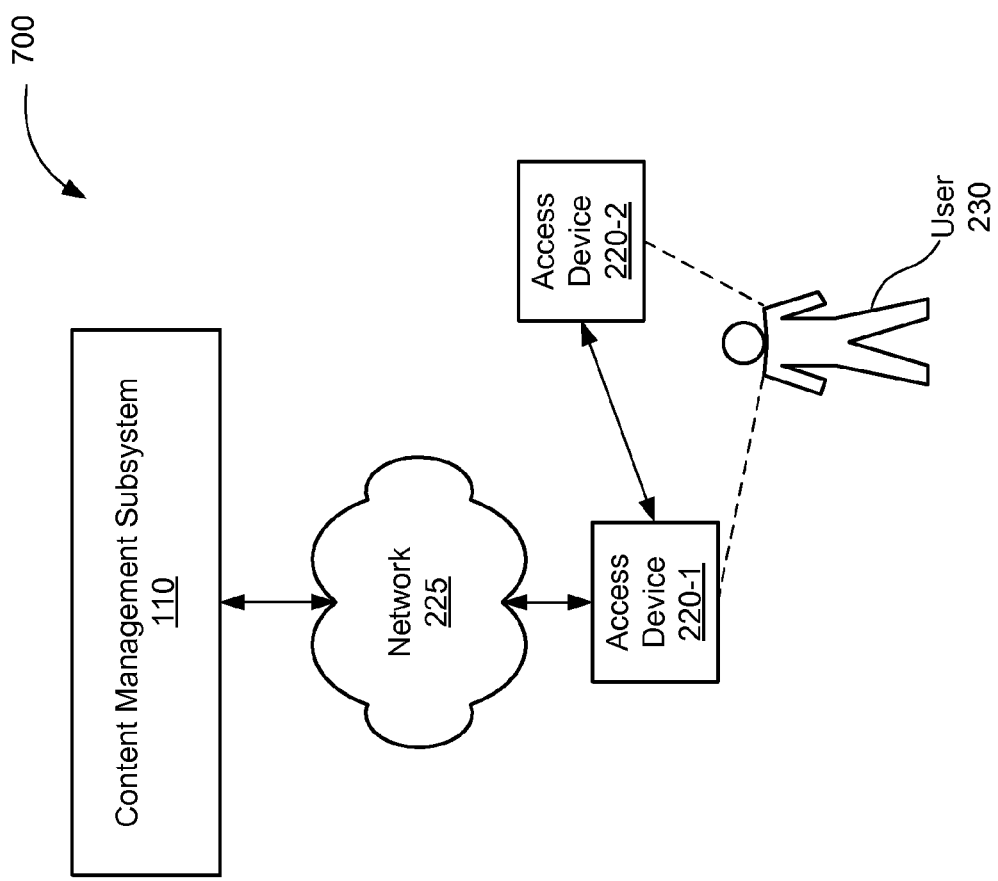
FIG. 7 illustrates an implementation of the system of FIG. 1 wherein an access device may be configured to communicate with content management subsystem by being communicatively coupled to another access device.

Hence, in some examples, an access device (e.g., access device 220-2) may be configured to indirectly communicate with content management subsystem 110 by being communicatively coupled to another access device (e.g., access device 220-1). FIG. 7 illustrates an implementation 700 of system 100 wherein access device 220-2 is configured to communicate with content management subsystem 110 by being communicatively coupled to another access device 220-1, which is configured to communicate with content management subsystem 110 over network 225.

Any suitable communication medium may be used to communicatively couple access device 220-2 to access device 220-1, such as a wire link (e.g., a USB link), wireless link (e.g., a Bluetooth or infrared link), and/or a local area network.

Hence, in this configuration, a user of access device 220-2 may upload content acquired by or otherwise resident on access device 220-2 by coupling the access device 220-2 to network-enabled access device 220-1 and using a suitable content transfer heuristic to transfer the content from the access device 220-2 to content management subsystem 110 by way of access device 220-1 and network 225. The content transfer heuristic may be user-instigated or automatic as may serve a particular application. A user of access device 220-2 may download content from content management subsystem 110 in a similar manner.

In some examples, content management subsystem 110 may be configured to backup data (e.g., content data 440, content metadata 445, user profile data 450, access device profile data 455, and/or group data 460). Any suitable backup procedure may be used such as, but not limited to, complete backups, differential backups, incremental backups, etc. In some examples, the backup data may be stored within data store 430 or within any other device or subsystem communicatively coupled to content management subsystem 110. In some examples, content management subsystem 110 may be configured to store data as a backup for data stored on one more access devices 220.

In some examples, access subsystem 120 may be configured to generate and provide one or more GUIs to a display for presentation to one or more users in order to facilitate management of content stored within content management subsystem 110, customization of one or more user preferences corresponding to content management subsystem 110, and/or access to content stored within content management subsystem 110. In some examples, one or more of the GUIs is generated in accordance with instructions provided by content management subsystem 110.

Exemplary GUIs that may be generated by access subsystem 120 will now be described in connection with FIGS. 8-13. It will be recognized that the GUIs shown and described herein are merely illustrative and that they may be modified, added to, or otherwise changed as may serve a particular application. For example, the layout and/or contents of the GUIs may be modified to conform to the processing and viewing requirements of different access devices 220.

Figure 8:
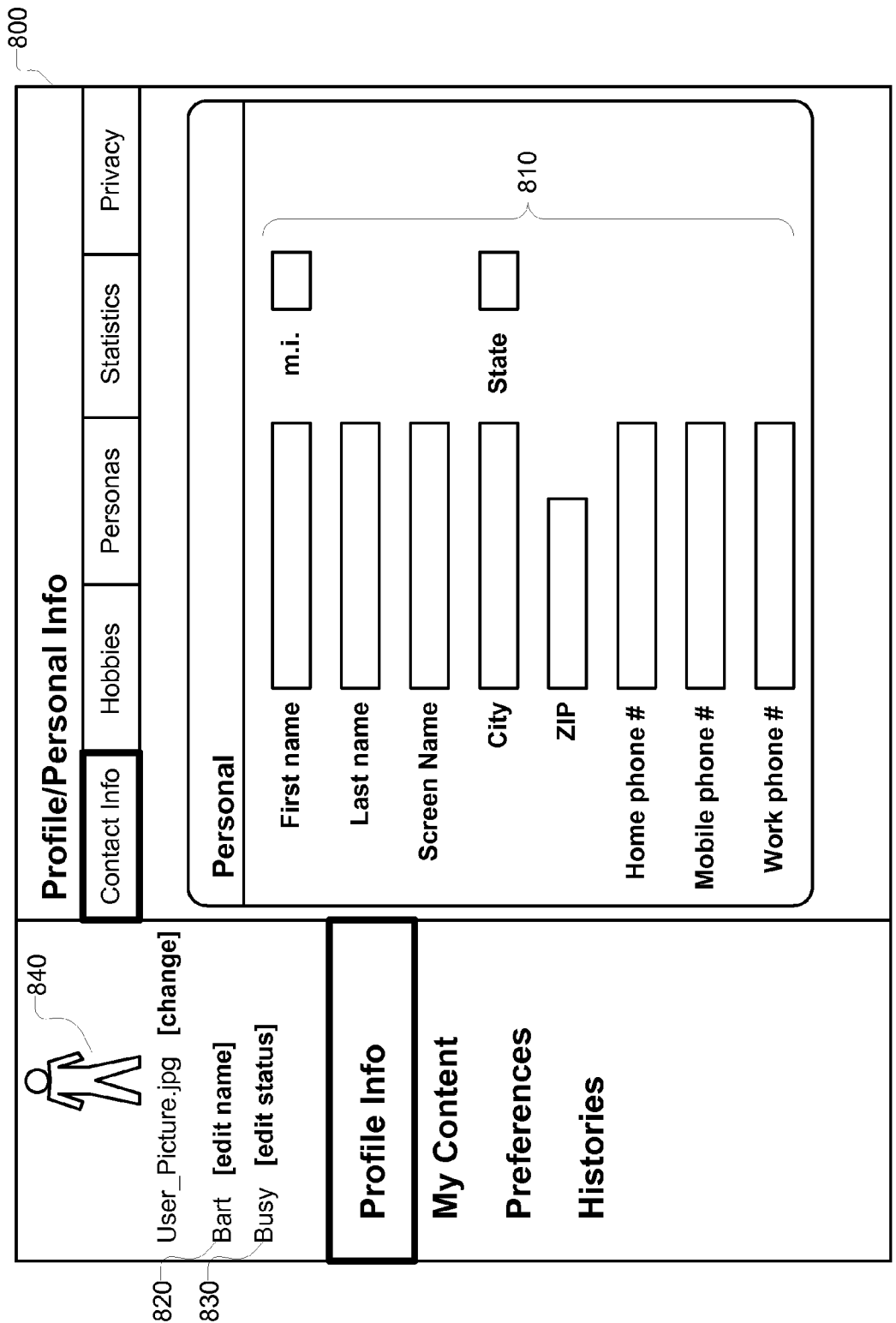
FIG. 8 shows a graphical user interface ("GUI") having a number of input fields that may be configured to facilitate entry of personal data associated with a particular user profile according to principles described herein.
Figure 9:
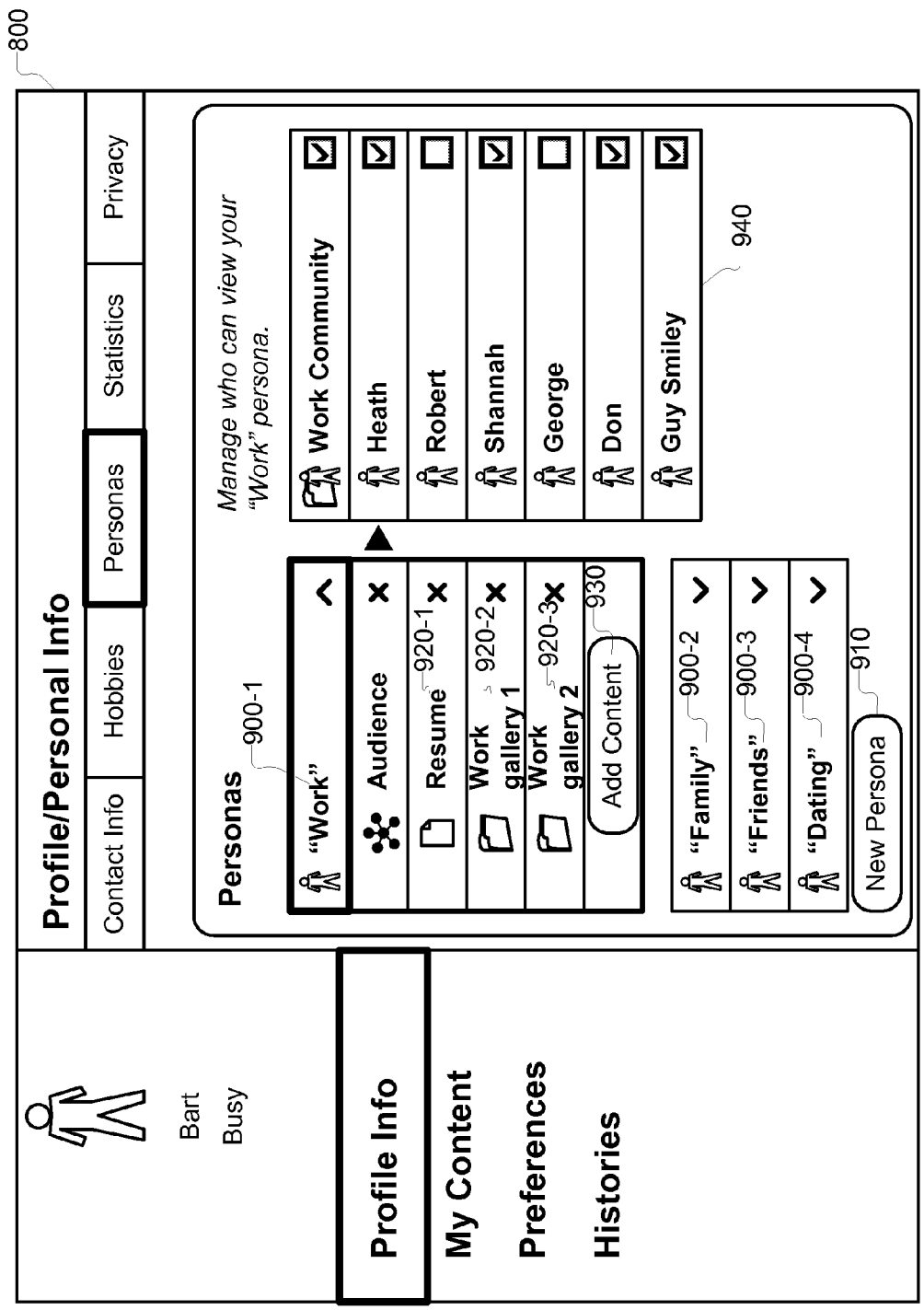
FIG. 9 shows that the GUI of FIG. 8 may be configured to facilitate management of one or more personas within a user profile according to principles described herein.

FIGS. 8-9 show an exemplary GUI 800 that may be displayed by access subsystem 120 to facilitate management of a user profile. As shown in FIGS. 8-9, GUI 800 may include a combination of graphics, text, input fields, and/or other information configured to facilitate creation, editing, and/or managing of one or more user profiles. To illustrate, FIG. 8 shows a number of input fields 810 that may be displayed and configured to facilitate entry of personal data associated with a particular user profile. Other customizable attributes associated with a user profile may include, but are not limited to, a user name 820, a user status 830, a user picture 840, and/or any other attribute as may serve a particular application.

In some examples, a user may have multiple "personas" within a user profile. Each "persona" may represent a certain set of characteristics, attributes, and/or preferences corresponding to the user. For example, a user may desire to have a "work" persona, a "family" persona, a "friends" persona, a "dating" persona, etc. In certain embodiments, a user may allow other users or groups of users to only have access to content associated with a certain persona and/or or otherwise view or interact with the specified persona. In this manner, a user may have a single user profile associated with content management subsystem 110 while still being able to represent himself or herself to other users of content management subsystem 110 in different ways. For example, a user may configure profile settings such that a certain content instance or type of content instance is available through a first user persona (e.g., a "family" persona) but is not available through another user persona (e.g., a "work" persona).

FIG. 9 shows that GUI 800 may be configured to facilitate management of one or more personas within a user profile. As shown in FIG. 9, the GUI 800 may include a listing of personas 900-1 through 900-4 (collectively referred to herein as "personas 900") associated with a user profile corresponding to a user of access subsystem 120. The listing of personas 900 shown in FIG. 9 is merely illustrative of the many different personas that may be associated with a user profile. It will be recognized that a user may add, edit, and/or remove a persona from a user profile as desired. For example, to add a new persona to a user profile, the user may select a "new persona" button 910.

In some examples, GUI 800 may be configured to facilitate association of one or more content instances with a particular persona 900. For example, FIG. 9 shows that a number of content instances 920-1 through 920-3 (e.g., a "resume" document, a "work gallery 1" collection of content instances, and a "work gallery 2" collection of content instances) are associated with "work" persona 900-1. In some examples, an "add content" button 930 may be selected in order to associate one or more content instances with persona 900-1. It will be recognized that content may be associated with more than one persona and/or with the user profile in general as may serve a particular application.

GUI 800 may also be configured to allow a user to manage how other users may interact with the user's user profile and/or one or more personas 900 within the user profile. For example, as shown in FIG. 9, a list of user profiles 940 corresponding to other users of content management subsystem 110 may be displayed within GUI 800. The list of other user profiles 940 may include the user profiles of one or more individuals, groups, and/or other organizations.

In some examples, a user may be able to associate one or more of the other user profiles 940 with the user's user profile and/or one or more personas 900 within with the user's user profile. For example, a user may configure profile settings such that a user profile for another user is associated with a first user persona (e.g., a "family" persona) but is not associated with another user persona (e.g., a "work" persona). As will be described in more detail below, different levels of access permissions for each of the other user profiles 940 may be set by the user as may serve a particular application.

In some examples, GUI 800 and/or one or more other GUIs described herein may be configured to allow a user to define at least one access rule corresponding to one or more content instances stored within content management subsystem 110. An "access rule" may specify or define one or more permissions, conditions, associations, and/or other factors that will be complied with in order for a user to access a content instance stored within content management subsystem 110 with a particular access device 220.

For example, a user may desire to limit access of a particular content instance to a particular group of users and to a particular type of access device 220 (e.g., a personal computer). To this end, the user may define one or more access rules specifying that only a particular user or group of users utilizing only a particular type of access device or network platform may access the content instance.

In some examples, an access rule may be based on one or more user profiles. For example, an access rule may be defined by associating one or more user profiles 940 corresponding to other users of content management subsystem 110 with the user's user profile and/or with one or more personas within the user's user profile. To illustrate, FIG. 9 shows that a number of user profiles (e.g., "work community," "Heath," "Shannah," "Don," and "Guy Smiley") have been associated with the "work" persona 900-1. Hence, these users may be provided with access to content that has also been associated with the "work" persona 900-1 (e.g., content instances 920-1 through 920-3).

Figure 10:
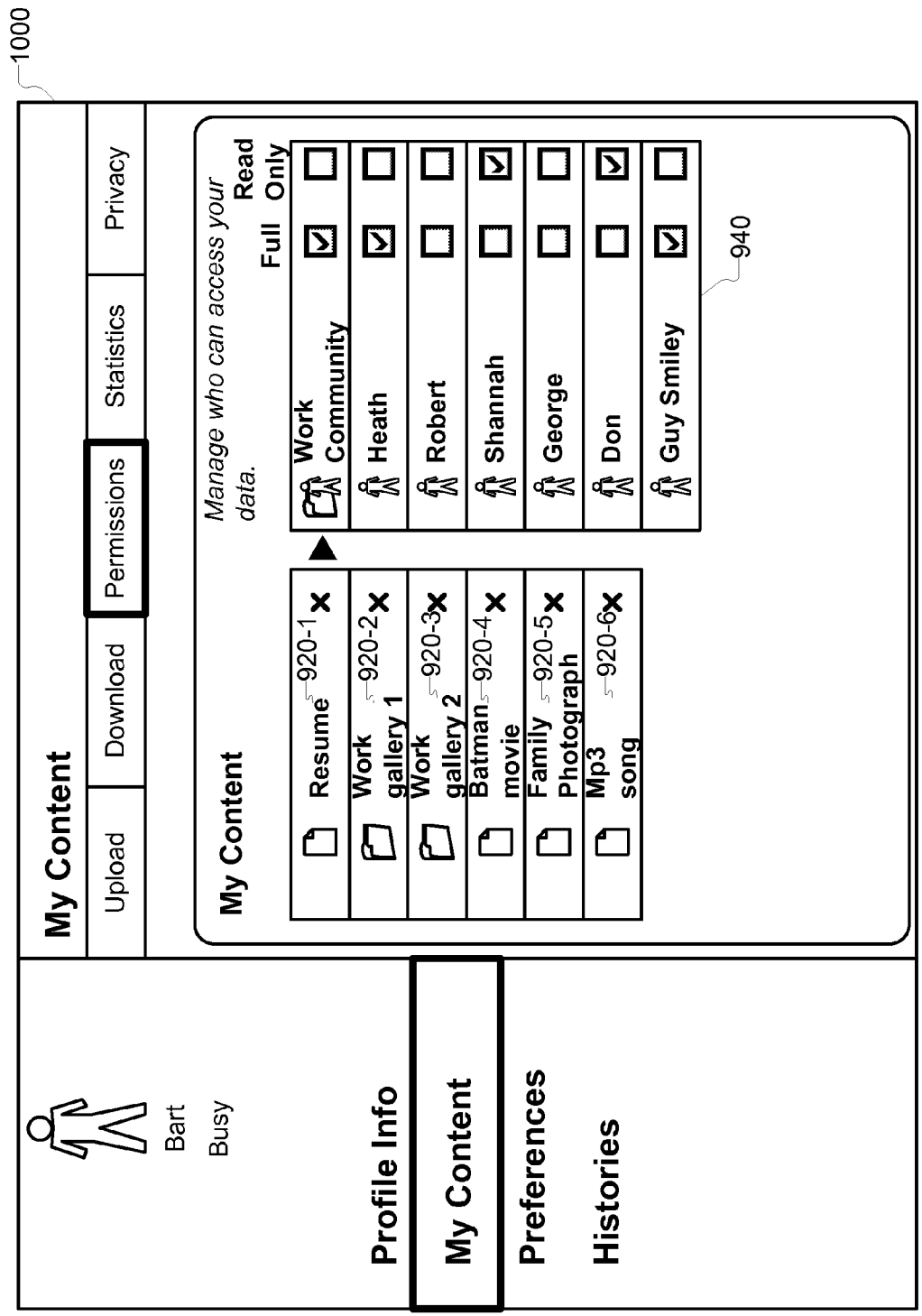
FIG. 10 illustrates an exemplary GUI configured to allow a user to define one or more access rules by setting access permissions for one or more content instances associated with the user according to principles described herein.

FIG. 10 illustrates an exemplary GUI 1000 configured to allow a user to define one or more access rules by setting access permissions for one or more content instances associated with the user. As shown in FIG. 10, a list of content instances 920 (content instances 920-1 through 920-6 in the illustrated example) associated with the user may be displayed within GUI 1000 along with a list of user profiles 940 corresponding to other users of content management subsystem 110. The user may select a particular content instance or group of content instances (e.g., the document entitled "resume" 920-1) to set access permissions for that content instance. For example, as shown in FIG. 10, the user may grant full or read only access to each of the users associated with user profiles 940 by checking an appropriate checkbox. In the illustrated example, the "Work Community," "Heath," and "Guy Smiley" user profiles have been given full access, the "Shannah" and "Don" user profiles have been given read only access, and the "Robert" and "George" user profiles have not been given access to content instance 920-1. Other types of access that may be set by the user include, but are not limited to, sharing access, download access, editing access, and/or any other level of access as may serve a particular application.

Figure 11:
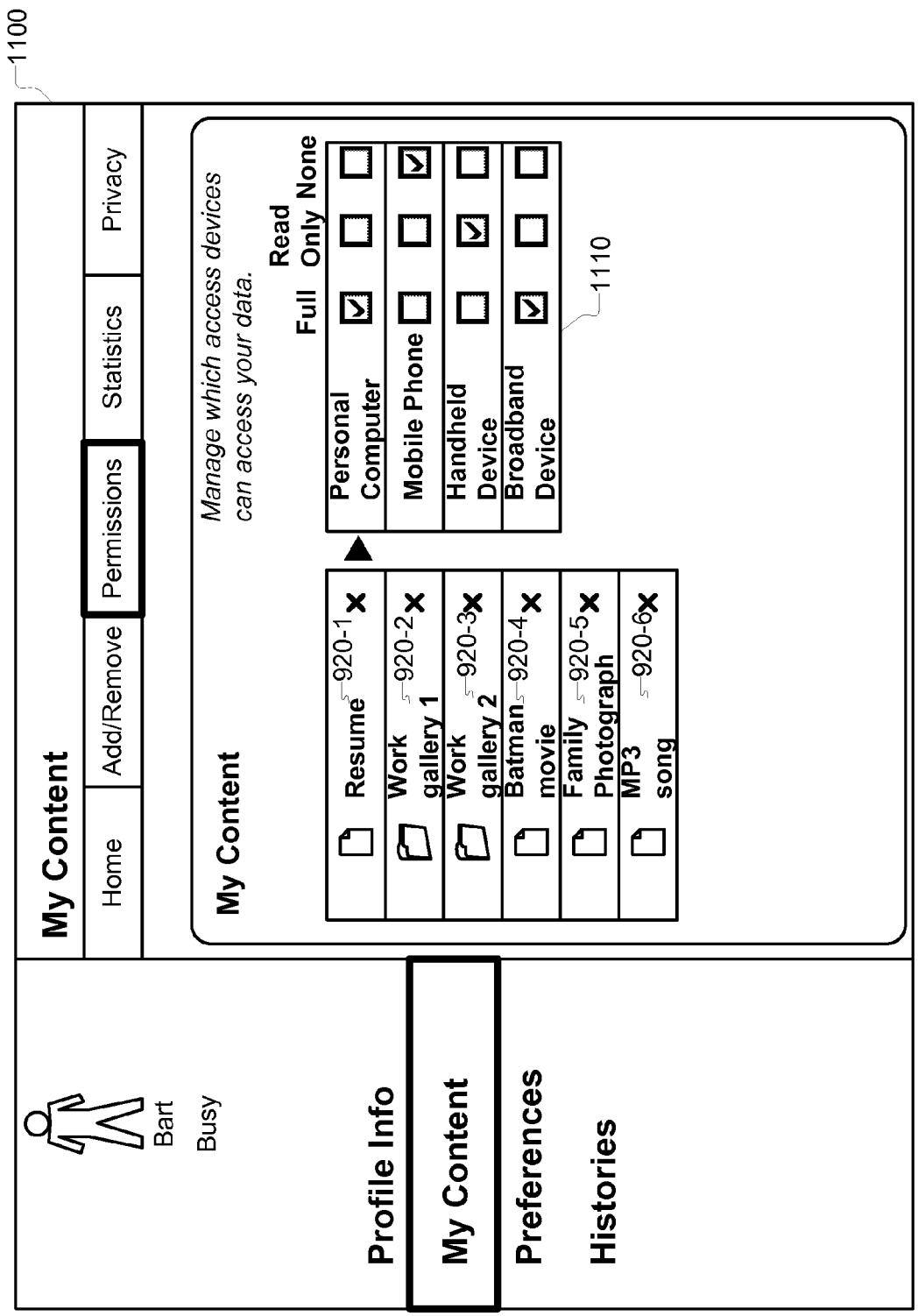
FIG. 11 illustrates an exemplary GUI configured to allow a user to define one or more access rules that are based on one or more access device profiles according to principles described herein.

One or more access rules may additionally or alternatively be based on one or more access device profiles. For example, FIG. 11 illustrates an exemplary GUI 1100 configured to allow a user to define one or more access rules that are based on one or more access device profiles. As shown in FIG. 11, a list of content instances 920 associated with the user may be displayed within GUI 1100 along with a list of access device profiles 1110. The list of access device profiles 1110 may include a description of one or more access devices 220 and/or types of access devices 220 that may potentially be used to request access to one or more of the content instances 920. The user may specify a level of access (e.g., full, read only, or none) that each access device 220 may have for each content instance 920.

To illustrate, a user may restrict access of certain types of content to certain types of access devices 220 that may be more capable than others of properly displaying or otherwise presenting the content of interest. For example, as shown in FIG. 11, the user may restrict "full" access of a content instance (e.g., resume 920-1) to personal computers and broadband devices. In the illustrated examples, mobile phones are denied access and other handheld devices are given read only access to content instance 920-1.

GUI 1100 may additionally or alternatively be configured to allow a user to specify other access rules based on one or more access device profiles. For example, GUI 1100 may be configured to allow a user to specify one or more content formatting procedures based on one or more access device profiles. To illustrate, a user may specify that photographs, video, and/or other graphics be reformatted to fit the display capabilities of a mobile phone, handheld device, or other access device. The reformatting may be performed by the content management subsystem 110 and/or the access subsystem 120.

Additionally or alternatively, a user may restrict access of content to access devices 220 having certain network addresses (e.g., network addresses corresponding to a particular geographic region, organization, etc.). To illustrate, a user may restrict access of content to access devices 220 that are a part of a particular company or that are physically located in a particular city, state, or region.

In some examples, one or more access rules may be determined automatically by content management subsystem 110. For example, content management subsystem 110 may be configured to detect a display or processing capability of an access device 220 attempting to access a particular content instance. The content management subsystem 110 may determine one or more access rules based on the detected capabilities of the access device 220 and provide or deny access to, or otherwise process the content instance in accordance with the access rules.

After one or more access rules have been defined for a particular content instance, content management subsystem 110 may be configured to perform a predefined action related to the content instance in response to a communication received from an access device 220. As used herein, a "communication" received from an access device 220 may include data representative of a request for the content instance from access device 220 to content management subsystem 110, data configured to establish a communication session between access device 220 and content management subsystem 110, and/or any other data transmitted from access device 220 to content management subsystem 110.

The "predefined action" may be selected and performed by the content management subsystem 110 in accordance with the access rules defined for the content instance and may include one or more of providing the access device 220 with a specified level of access to the content instance, formatting the content instance for the access device 220, denying access to the content instance, and otherwise processing the content instance.

To illustrate, a user 230 may upload a resume 920-1 to content management subsystem 110 and utilize GUIs 1000 and 1100 shown in FIGS. 10-11 to define access rules corresponding to the resume 920-1. For example, the user 230 may utilize GUI 1000 to specify which users and/or groups of users may have access to the resume 920-1. GUI 1000 may also be utilized to define particular levels of access to the resume 920-1 that other users may have. GUI 1100 may be used to specify the level of access that different access devices 220 may have for the resume 920-1. For example, the user 230 may specify that the resume may only be accessed by access devices 220 having a particular capability or network address.

With these access rules so defined, content management subsystem 110 may perform any of a number of predefined actions in response to a communication received from an access device 220. For example, another user 230 may utilize an access device 220 to transmit a request for access to resume 920-1 to content management subsystem 110. Content management subsystem 110 may process the request and allow access device 220 access to the resume 920-1, deny access device 220 access to the resume 920-1, format the resume 920-1 for downloading by the access device 220, and/or perform any other action in accordance with the access rules.

Figure 12:
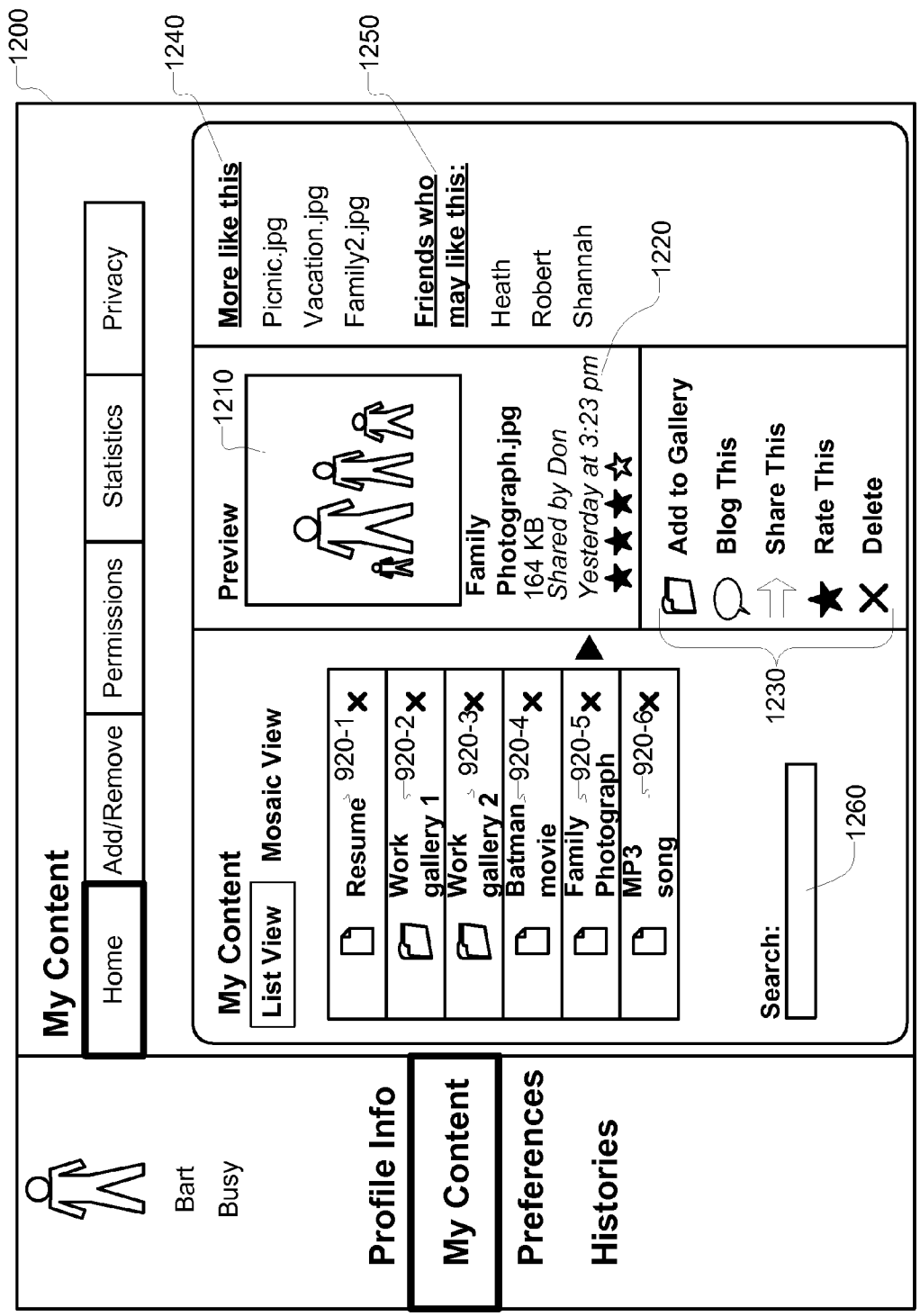
FIG. 12 illustrates an exemplary GUI that may be provided by access subsystem and configured to provide other options related to content stored within content management subsystem according to principles described herein.

FIG. 12 illustrates an exemplary GUI 1200 that may be provided by access subsystem 120 and configured to provide other options related to content stored within content management subsystem 110. As shown in FIG. 12, GUI 1200 may include a list of content instances 920 associated with a user 230, a preview 1210 of a selected content instance (e.g., content instance 920-5), information 1220 corresponding to the selected content instance 920-5, selectable options 1230 related to the selected content instance 920-5, a list of content instances 1240 that are related to the selected content instance 920-5, a list of other users 1250 who may be interested in the selected content instance 920-5, and/or a search field 1260 configured to facilitate searching through one or more of the content instances 920. It will be recognized that GUI 1200 may include additional or alternative features, information, and/or options as may serve a particular application.

As shown in FIG. 12, one of the options 1230 may be to publish the selected content instance 920-5 to a blog or other type of website. In some examples, content management subsystem 110 may be configured to automatically generate an RSS feed or other type of indicator whenever a content instance is added to a particular folder, gallery, or other location. The RSS feed may be configured to notify other users of the newly added content instance. In other embodiments, content management subsystem 110 may be configured to provide notification of new content using other suitable technologies.

Another one of the options 1230 may be to delete the selected content instance 920-5. In some examples, the content instance 920-5 may be deleted from the content management subsystem 110. Additionally or alternatively, selection of the "delete" option may cause the content management subsystem 110 to remove copies of the content instance 920-5 that have been downloaded by other access devices 220.

Figure 13:
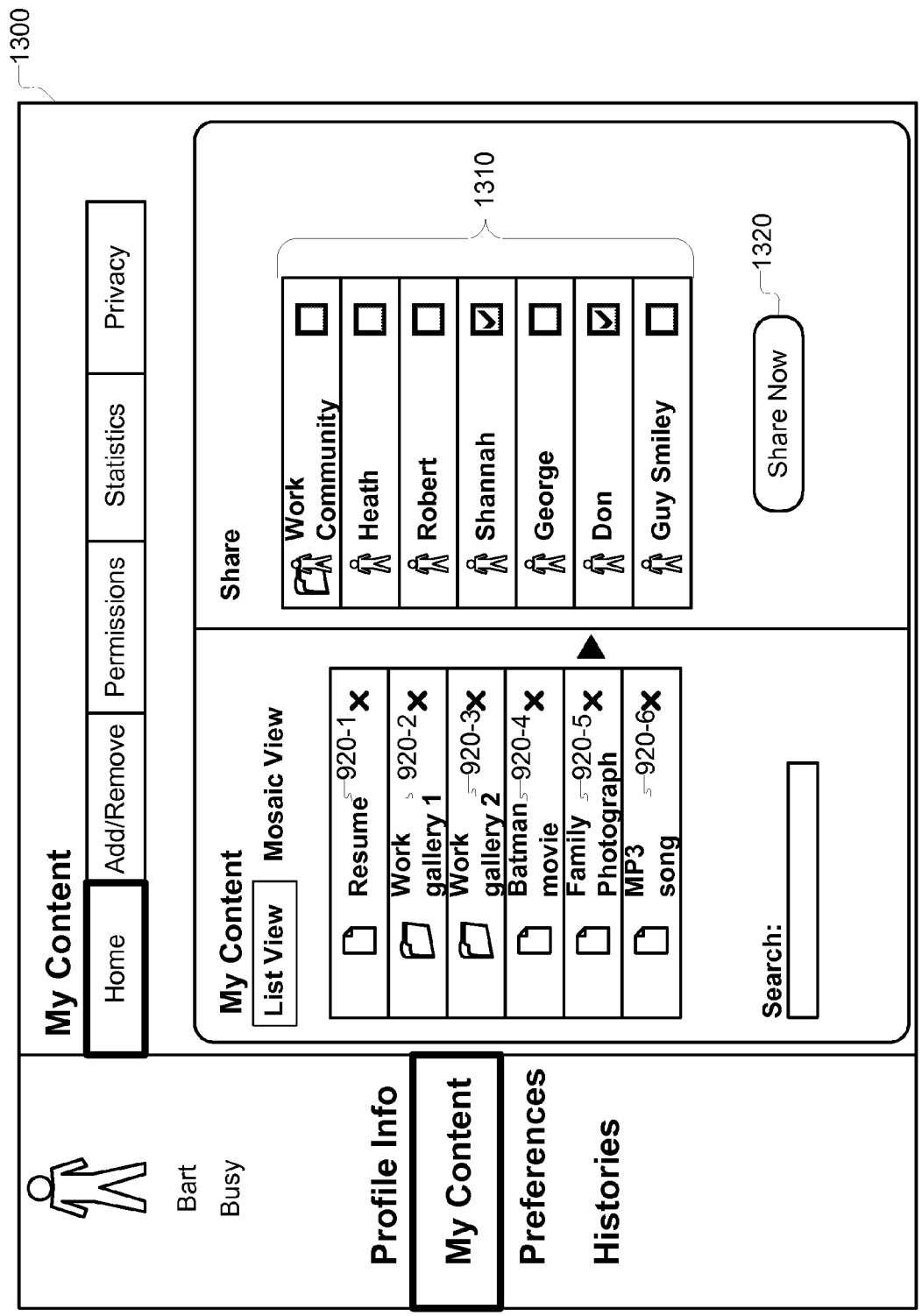
FIG. 13 shows a GUI that may be displayed after a "share" option shown in FIG. 12 is selected according to principles described herein.

Another one of the options 1230 may be to share the selected content instance 920-5 with another user and/or with another access device 220. To illustrate, FIG. 13 shows a GUI 1300 that may be displayed after the "share" option shown in FIG. 12 is selected. As shown in FIG. 13, a list 1310 of users and/or groups of users may be displayed within GUI 1300. A user 230 may select one or more of the users and/or groups of users included within list 1310 and then press a "share now" button 1320 to share the selected content instance 920-5 with the selected users. In some examples, a link (e.g., a hyperlink) to the selected content instance 920-5 may be sent to the selected users. The users may then select the link to access the content instance 920-5. Alternative methods of sharing content may be used as may serve a particular application. For example, a data file representing the selected content instance 920-5 may be transmitted to the selected users. In this manner, the selected users may access the selected content instance 920-5 without having to log in to the content management subsystem 110.

Returning to FIG. 12, the list of content instances 1240 that are related to the selected content instance 920-5 may be generated by recommendation facility 475 in any of the ways described above. The content instances included within list 1240 may be already associated with the user, one or more other users, and/or a content provider (e.g., available for purchase). In some examples, one or more of the content instances shown within list 1240 may be viewed, downloaded, purchased, or otherwise accessed by the user.

The list of other users 1250 who may be interested in the selected content instance 920-5 may be generated by recommendation facility 475 in any of the ways described above. The user may select one or more names within list 1250 to share the selected content instance 920-5 with the corresponding users.

The search field 1260 shown within GUI 1200 may be used to search for one or more content instances, user profiles, access device profiles, and/or any other information managed by content management subsystem 110. For example, a user may locate a particular content instance of interest by typing one or more keywords into search field 1260. Any suitable search heuristic may be used by content management subsystem 110 to locate the desired data.

Figure 14:
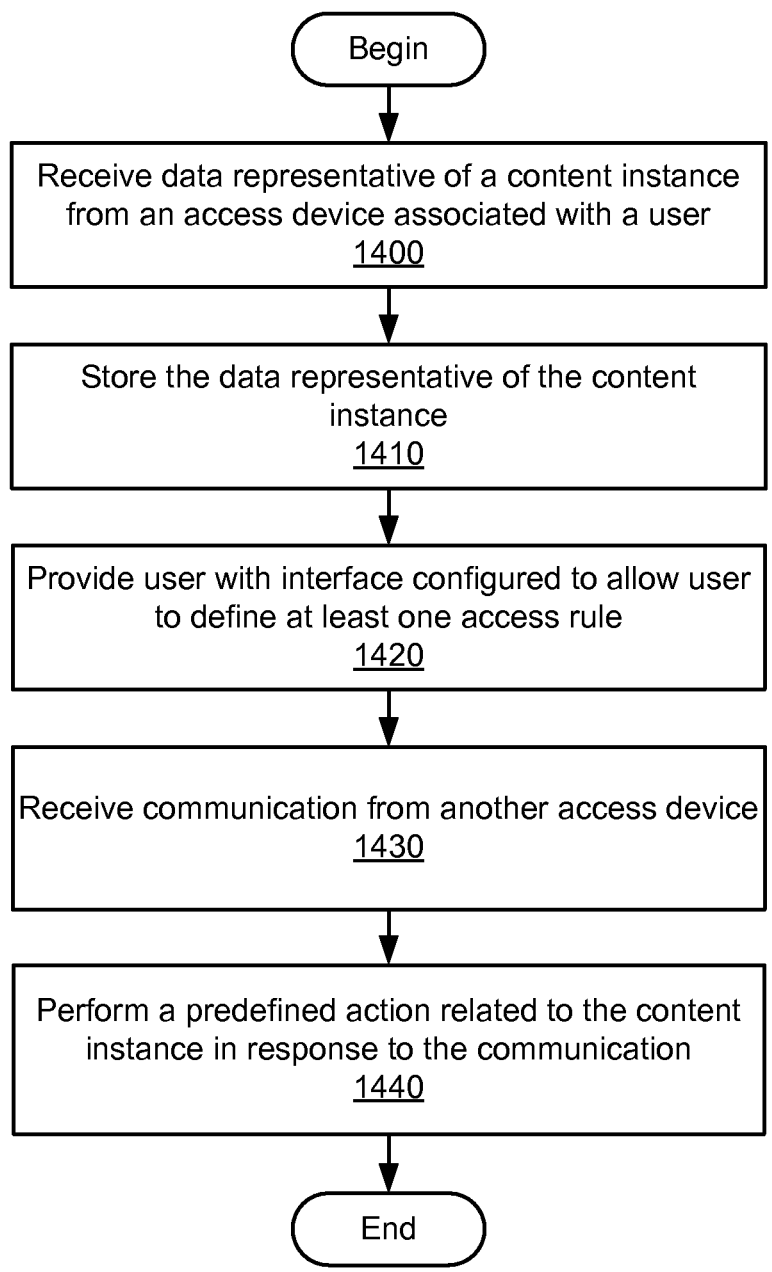
FIG. 14 illustrates an exemplary content management and access method according to principles described herein.

FIG. 14 illustrates an exemplary content management and access method. While FIG. 14 illustrates exemplary steps according to one embodiment, other embodiments may omit, add to, reorder, and/or modify any of the steps shown in FIG. 14.

In step 1400, data representative of a content instance is received from an access device associated with a user. In some examples, the data representative of a content instance is received by a content management subsystem, such as content management subsystem 110. The data representative of a content instance may be transmitted by the access device in any of the ways described herein, including over network 225.

In step 1410, the data representative of a content instance is stored. For example, the data representative of a content instance may be stored within a data store, such as data store 430.

In step 1420, the user is provided with an interface configured to allow the user to define at least one access rule. The interface may include or be similar to any of the GUIs described herein, and may be displayed by the access device associated with the user or by any other device as may serve a particular application. The at least one access rule may be defined in any of the ways herein and may, for example, be based on at least one user profile and/or access device profile.

In step 1430, a communication is received from another access device. The communication may be made over network 225, for example, and may include data representative of a request for the content instance, data configured to establish a communication session between the other access device and the content management subsystem, and/or any other data transmitted from the other access device to the content management subsystem.

In step 1440, the content management subsystem performs a predefined action related to the content instance in response to the communication. The predefined action may be selected and performed by the content management subsystem in accordance with the at least one access rule defined for the content instance and may include providing the other access device with a specified level of access to the content instance, formatting the content instance for the other access device, denying access by the other access device to the content instance, and/or otherwise processing the content instance.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
  receiving data representative of a content instance over a network from a first access device associated with a first user;
  storing said content instance;
  defining at least one access rule corresponding to said content instance, said at least one access rule based on a user profile associated with said first user and at least one access device profile, said defining comprising
    presenting, within a single graphical user interface view, a list showing a plurality of personas included within said user profile associated with said first user together with a separate list showing a plurality of users other than said first user,
    receiving first input that is representative of
      a selection by said first user of a first persona included in said plurality of personas, said separate list including at least one user that is not associated with said first persona, and
      a selection by said first user of a first set of selected users including said at least one user that is not associated with said first persona, said first input provided by said first user by way of said single graphical user interface view, said first input causing a corresponding update to said separate list as presented in said single graphical user interface view,
    associating, based on said first input, each of said users in said first set of selected users with said first persona,
    receiving second input that is representative of
      a selection by said first user of a second persona included in said plurality of personas,
      a selection by said first user of a second set of selected users, said second input provided by said first user by way of said single graphical user interface view, said second input causing a corresponding update to said separate list as presented in said single graphical user interface view, said first set of selected users differing from said second set of selected users, at least one selected user being included in both said first set of selected users and said second set of selected users, and associating, based on said second input, said second set of selected users with said second persona;

receiving, from a second access device associated with a second user over said network, a request for the second user to access the content instance by way of the second access device;

determining that a particular persona included in said plurality of personas is associated with both of said content instance and said second user; and performing a predefined action related to said content instance in response to said request and in accordance with said at least one access rule, said predefined action comprising providing said second access device with a level of access to said content instance as specified by the particular persona and in accordance with an access device profile associated with said second access device.

2. The method of claim 1, further comprising:

using a first network platform to receive said data representative of said content instance; and using a second network platform to receive said request.

3. The method of claim 1, wherein said predefined action further comprises at least one of formatting said content instance for said second access device and denying access to said content instance.

4. The method of claim 1, further comprising associating said content instance with at least one of said user profile and said at least one access device profile.

5. The method of claim 1, wherein said single graphical user interface view comprises at least one graphical user interface displayed by said first access device associated with said first user.

6. The method of claim 1, further comprising providing one or more content recommendations related to said content instance.

7. The method of claim 1, wherein said single graphical user interface view is further configured to facilitate sharing of said content instance with one or more other users.

8. The method of claim 1, tangibly embodied as computer-executable instructions on at least one non-transitory computer-readable storage medium.

9. The method of claim 1, wherein:

said particular persona is associated with said content instance and a plurality of types of access device;

said at least one access rule restricts access to said content instance by one or more of said plurality of types of access device.

10. The method of claim 1, wherein:

said particular persona is associated with said content instance and a plurality of other users;

said at least one access rule restricts access to said content instance by one or more of said plurality of other users.

11. The method of claim 6, further comprising identifying one or more relationships between said content instance and one or more other content instances;

wherein the providing said one or more content recommendations related to said content instance further comprises providing one or more links to said one or more other content instances based on said one or more relationships between said content instance and said one or more other content instances.

12. The method of claim 1, wherein:

said predefined action further comprises applying a specific formatting to said content instance for said second access device in accordance with a type of device identified in the access device profile associated with said second access device.

13. The method of claim 1, wherein defining said at least one access rule further comprises:

receiving input that is representative of a selection by said first user granting full access to said content instance by at least one of said first set of selected users;

receiving input that is representative of a selection by said first user granting partial access to said content instance by at least another of said first set of selected users;

denying access to said content instance by users from said list showing said plurality of users that are not included in said first set of selected users.

14. A system comprising at least one computing device, the at least one computing device implementing:

a content management subsystem configured to maintain data representative of a plurality of content instances; and a first access subsystem associated with a first user and selectively and communicatively coupled to said content management subsystem over a network;

wherein said first access subsystem is configured to transmit data representative of a content instance to said content management subsystem, and define at least one access rule corresponding to said content instance, said at least one access rule based on a user profile associated with said first user and at least one access device profile, by presenting, within a single graphical user interface view, a list showing a plurality of personas included within said user profile associated with said first user together with a separate list showing a plurality of users other than said first user, receiving first input that is representative of a selection by said first user of a first persona included in said plurality of personas, said separate list including at least one user that is not associated with said first persona, and a selection by said first user of a first set of selected users including said at least one user that is not associated with said first persona, said first input provided by said first user by way of said single graphical user interface view, said first input causing a corresponding update to said separate list as presented in said single graphical user interface view, associating, based on said first input, each of said users in said first set of selected users with said first persona, receiving second input that is representative of a selection by said first user of a second persona included in said plurality of personas, a selection by said first user of a second set of selected users, said second input provided by said first user by way of said single graphical user interface view, said second input causing a corresponding update to said separate list as presented in said single graphical user interface view, said first set of selected users differing from said second set of selected users, at least one selected user being included in both said first set of selected users and said second set of selected users, and associating, based on said second input, said second set of selected users with said second persona; and wherein said content management subsystem is configured to receive, from a second access subsystem associated with a second user over said network, a request for the second user to access the content instance by way of the second access subsystem, determine that a particular persona included in said plurality of personas is associated with both of said content instance and said second user; and perform a predefined action related to said content instance in response to said request and in accordance with said at least one access rule, said content management subsystem being configured to perform said predefined action by providing said second access subsystem with a level of access to said content instance as specified by the particular persona and in accordance with an access device profile associated with said second access subsystem.

15. The system of claim 14, wherein said content management subsystem is further configured to perform said predefined action by formatting said content instance for said second access subsystem or denying access to said content instance.

16. The system of claim 14, wherein said single graphical user interface view comprises at least one graphical user interface displayed by said first access subsystem.

17. The system of claim 14, wherein said content management subsystem further comprises a recommendation facility configured to provide one or more content recommendations related to said content instance to said first access subsystem.

18. The system of claim 14, wherein said content management subsystem further comprises a sharing facility configured to facilitate sharing of said content instance with one or more other users.

19. A system comprising:

a communication facility configured to receive data representative of a content instance over a network from a first access device associated with a first user;

a data store configured to store said data representative of said content instance;

a processing facility configured to perform a predefined action related to said content instance in response to a request from a second access device associated with a second user and in accordance with at least one access rule corresponding to said content instance; and at least one computing device implementing the communication facility, the data store, and the processing facility;

wherein said at least one access rule is based on a user profile associated with said first user and an access device profile, wherein said processing facility is further configured to define said at least one access rule by presenting, within a single graphical user interface view, a list showing a plurality of personas included within said user profile associated with said first user together with a separate list showing a plurality of users other than said first user, receiving first input that is representative of a selection by said first user of a first persona included in said plurality of personas, said separate list including at least one user that is not associated with said first persona, and a selection by said first user of a first set of selected users including said at least one user that is not associated with said first persona, said first input provided by said first user by way of said single graphical user interface view, said first input causing a corresponding update to said separate list as presented in said single graphical user interface view, associating, based on said first input, each of said users in said first set of selected users with said first persona, receiving second input that is representative of a selection by said first user of a second persona included in said plurality of personas, a selection by said first user of a second set of selected users, said second input provided by said first user by way of said single graphical user interface view, said second input causing a corresponding update to said separate list as presented in said single graphical user interface view, said first set of selected users differing from said second set of selected users, at least one selected user being included in both said first set of selected users and said second set of selected users, and associating, based on said second input, said second set of selected users with said second persona, and wherein said processing facility is further configured to determine that a particular persona included in said plurality of personas is associated with both of said content instance and said second user, and perform said predefined action in response to said request and in accordance with said at least one access rule by providing said second access device with a level of access to said content instance as specified by the particular persona and in accordance with said access device profile associated with said second access device.

20. The system of claim 19, wherein said processing facility is further configured to perform said predefined action by performing at least one of formatting said content instance for said second access device and denying access to said content instance.

21. The system of claim 19, further comprising a recommendation facility configured to provide one or more content recommendations related to said content instance to said first access device.

22. The system of claim 19, further comprising a sharing facility configured to facilitate sharing of said content instance with one or more other users.

23. The method of claim 13, wherein said partial access comprises read only access.

* * * * *